US008083140B1

(12) United States Patent
Katzer et al.

(10) Patent No.: US 8,083,140 B1
(45) Date of Patent: Dec. 27, 2011

(54) SYSTEM AND METHOD OF OVER-THE-AIR PROVISIONING

(75) Inventors: Robin Dale Katzer, Olathe, KS (US); Kevin Zhu, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 694 days.

(21) Appl. No.: 12/026,224

(22) Filed: Feb. 5, 2008

(51) Int. Cl.
*G06Q 40/00* (2006.01)

(52) U.S. Cl. ......... 235/383; 235/384; 235/385; 380/262
(58) Field of Classification Search .................. 235/383, 235/385, 384; 380/262
See application file for complete search history.

(56) References Cited

U.S. PATENT DOCUMENTS

| | | | |
|---|---|---|---|
| 5,276,311 A | | 1/1994 | Hennige |
| 5,310,999 A | * | 5/1994 | Claus et al. .................. 235/384 |
| 5,453,601 A | | 9/1995 | Rosen |
| 5,530,702 A | * | 6/1996 | Palmer et al. ................. 370/445 |
| 5,590,038 A | | 12/1996 | Pitroda |
| 6,000,608 A | | 12/1999 | Dorf |
| 6,012,634 A | | 1/2000 | Brogan et al. |
| 6,122,625 A | | 9/2000 | Rosen |
| 6,199,161 B1 | | 3/2001 | Ahvenainen |
| 6,290,127 B1 | | 9/2001 | Schilling |
| 6,360,954 B1 | | 3/2002 | Barnardo |
| 6,405,181 B2 | | 6/2002 | Lent et al. |
| 6,466,777 B1 | | 10/2002 | Urita |
| 6,591,098 B1 | | 7/2003 | Shieh et al. |
| 6,631,849 B2 | | 10/2003 | Blossom |
| 6,679,423 B2 | | 1/2004 | Ijichi et al. |
| 6,705,521 B1 | * | 3/2004 | Wu et al. ................. 235/384 |
| 6,755,342 B1 | | 6/2004 | Jordan, Jr. |
| 6,817,521 B1 | | 11/2004 | Matada |
| 6,938,821 B2 | | 9/2005 | Gangi |
| 7,146,159 B1 | | 12/2006 | Zhu |
| 7,233,785 B2 | | 6/2007 | Yamagishi et al. |
| 7,269,256 B2 | | 9/2007 | Rosen |
| 7,413,113 B1 | | 8/2008 | Zhu |
| 7,434,723 B1 | | 10/2008 | White et al. |
| 7,475,044 B1 | | 1/2009 | Kawai et al. |

(Continued)

FOREIGN PATENT DOCUMENTS

WO WO2004105421 A2 12/2004

OTHER PUBLICATIONS

Zhu, Kevin, "System and Method of Provisioning Confidential Information Via a Mobile Device," U.S. Appl. No. 12/254,267, filed Oct. 20, 2008.

(Continued)

*Primary Examiner* — Daniel Felten

(57) ABSTRACT

A system for over-the-air provisioning is disclosed. The system comprises a processor and an over-the-air server application. The over-the-air server application, when executed by the processor, is configured to begin an over-the-air provisioning session, to request a log of an over-the-air client, to receive the log, to send a first plurality of action requests to the over-the-air client based on the log, to receive acknowledgments of the action request, to stop the over-the-air provisioning session when an acknowledgment is not received within a first time period, and to restart the over-the-air provisioning session after waiting a second time period when the over-the-air provisioning session has been stopped, wherein the first plurality of action requests comprise a first task.

20 Claims, 7 Drawing Sheets

U.S. PATENT DOCUMENTS

| | | | |
|---|---|---|---|
| 7,494,067 B1 | 2/2009 | Zhu | |
| 7,546,956 B2 | 6/2009 | Adams et al. | |
| 7,644,859 B1 | 1/2010 | Zhu | |
| 7,676,432 B2 | 3/2010 | Ling | |
| 7,819,307 B2 | 10/2010 | Lyons et al. | |
| 7,822,688 B2 | 10/2010 | Labrou et al. | |
| 7,926,714 B1 | 4/2011 | Zhu | |
| 2001/0013551 A1 | 8/2001 | Ramachandran | |
| 2002/0052193 A1 | 5/2002 | Chetty | |
| 2002/0052754 A1 | 5/2002 | Joyce et al. | |
| 2002/0088852 A1 | 7/2002 | Ohta et al. | |
| 2002/0128982 A1 | 9/2002 | Gefwert et al. | |
| 2002/0136199 A1 | 9/2002 | Hartmaier | |
| 2002/0188575 A1* | 12/2002 | Freeny, Jr. | 705/72 |
| 2002/0195487 A1 | 12/2002 | Hosogoe | |
| 2003/0070080 A1 | 4/2003 | Rosen | |
| 2003/0083933 A1 | 5/2003 | McAlear | |
| 2003/0125054 A1 | 7/2003 | Garcia | |
| 2003/0161503 A1 | 8/2003 | Kramer | |
| 2003/0220876 A1 | 11/2003 | Burger et al. | |
| 2003/0233320 A1 | 12/2003 | Connor, Jr. | |
| 2004/0044622 A1 | 3/2004 | Blott et al. | |
| 2004/0122685 A1 | 6/2004 | Bunce | |
| 2004/0139024 A1 | 7/2004 | So | |
| 2004/0159700 A1 | 8/2004 | Khan et al. | |
| 2004/0198333 A1 | 10/2004 | Zanaty | |
| 2004/0204070 A1 | 10/2004 | August et al. | |
| 2006/0073808 A1 | 4/2006 | Buchert | |
| 2006/0165060 A1 | 7/2006 | Dua | |
| 2006/0211408 A1 | 9/2006 | Yamagishi et al. | |
| 2007/0095892 A1 | 5/2007 | Lyons et al. | |
| 2007/0278291 A1 | 12/2007 | Rans et al. | |
| 2007/0281664 A1 | 12/2007 | Kaneko et al. | |
| 2008/0059379 A1 | 3/2008 | Ramaci et al. | |
| 2008/0067240 A1 | 3/2008 | Nakano et al. | |
| 2008/0201212 A1 | 8/2008 | Hammad et al. | |
| 2008/0208681 A1 | 8/2008 | Hammad et al. | |
| 2009/0018964 A1 | 1/2009 | Liu et al. | |
| 2009/0050689 A1 | 2/2009 | Sako et al. | |
| 2009/0093272 A1 | 4/2009 | Saarisalo et al. | |
| 2010/0030651 A1 | 2/2010 | Matotek et al. | |
| 2010/0133337 A1 | 6/2010 | Van Rensburg | |

OTHER PUBLICATIONS

Zhu, Kevin, "Partially Delegated Over-the-Air Provisioning of a Secure Element," U.S. Appl. No. 12/348,371, filed Jan. 5, 2009.

Persson, Sarah A.V., et al., Patent Application entitled, "Electronic Wallet Removal from Mobile Electronic Devices," filed Feb. 16, 2009, U.S. Appl. No. 12/371,901.

BlackBerry Enterprise Server for Microsoft Exchange, Version 4.0—Handheld Management Guide, Last Modified Aug. 18, 2006, Research In Motion Limited, Canada.

BlackBerry Enterprise Server for Microsoft Exchange, Version 4.0—Administration Guide, Last Modified Nov. 10, 2006, Research In Motion Limited, Canada.

Derfler, Frank J., et al., "How Networks Work," Sep. 2000, Que Corporation, A Division of MacMillan Computer Publishing, USA.

Office Action—Restriction dated Mar. 16, 2011, U.S. Appl. No. 12/348,371.

Office Action dated May 24, 2011, U.S. Appl. No. 12/348,371.

Office Action—Restriction dated Mar. 14, 2011, U.S. Appl. No. 12/371,901.

Office Action dated Apr. 14, 2011, U.S. Appl. No. 12/371,901.

Office Action dated Oct. 5, 2010, U.S. Appl. No. 12/254,267.

Final Office Action dated Mar. 7, 2011, U.S. Appl. No. 12/254,267.

Office Action dated Oct. 3, 2005, U.S. Appl. No. 10/744,169.

Office Action dated Feb. 2, 2006, U.S. Appl. No. 10/744,169.

Final Office Action dated Jun. 8, 2006, U.S. Appl. No. 10/744,169.

Notice of Allowance dated Aug. 1, 2006, U.S. Appl. No. 10/744,169.

Notice of Allowance dated Sep. 9, 2011, U.S. Appl. No. 12/348,371.

Anonymous, "Sourcebook '96," Progressive Grocer Sourcebook '96 Supplement, Dec. 1995, pp. Cover-48, Maclean-Hunter Media Inc.

* cited by examiner

US 8,083,140 B1

SYSTEM AND METHOD OF OVER-THE-AIR PROVISIONING

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile terminals, for example mobile phones, personal digital assistants, and others, have become very widely distributed throughout our society. Increasingly mobile terminals are provisioned with financial and/or payment capabilities such as electronic wallets, credit cards, debit cards, and/or transit cards. Some of these cards may be provisioned in a secure element (SE) portion of the memory of the mobile terminal. Typically, secure elements are communicated with according to known protocols directed to promote security of information stored in the secure element, for example, personal financial information. Over time, new cards may be provisioned in the secure element of the mobile terminal or in other portions of the memory of the mobile terminal. Provisioning of new cards may be performed over-the-air (OTA), for example, by an over-the-air server sending provisioning messages to an over-the-air client on the mobile terminal.

SUMMARY

A system for over-the-air provisioning is disclosed. The system comprises a processor and an over-the-air server application. The over-the-air server application, when executed by the processor, is configured to begin an over-the-air provisioning session, to request a log of an over-the-air client, to receive the log, to send a first plurality of action requests to the over-the-air client based on the log, to receive acknowledgments of the action request, to stop the over-the-air provisioning session when an acknowledgment is not received within a first time period, and to restart the over-the-air provisioning session after waiting a second time period when the over-the-air provisioning session has been stopped, wherein the first plurality of action requests comprise a first task.

A method of provisioning an electronic device is provided. The method comprises sending a first request to an over-the-air client, the first request including an identification of a first requested action and a first task identity. The method also comprises sending a second request to the over-the-air client after sending the first request, the second request including an identification of a second requested action and a second task identity. The method also comprises sending a third request to the over-the-air client after sending the second request, the third request including an identification of a third requested action and the first task identity. The first task identity identifies a first task to be accomplished by the over-the-air client, and accomplishing the first task comprises at least accomplishing the first requested action and accomplishing the third requested action.

Another system for over-the-air provisioning is also provided. The system comprises a mobile terminal and an over-the-air server. The mobile terminal comprises a processor and an over-the-air client that, when executed by the processor, is configured to perform a workflow action based on a received request, wherein the request includes a requested action and a task identity, and to produce an acknowledgment indicating the result of the workflow action and the task identity. The over-the-air server is configured to establish a connection to the mobile terminal, to segment a task associated with the task identity into multiple requests, to manage transmitting the multiple requests to the mobile terminal in sequence, and to receive the acknowledgment of each of the requests from the mobile terminal, wherein managing the transmitting of the multiple requests is based in part on the acknowledgment of each of the requests from the mobile terminal.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
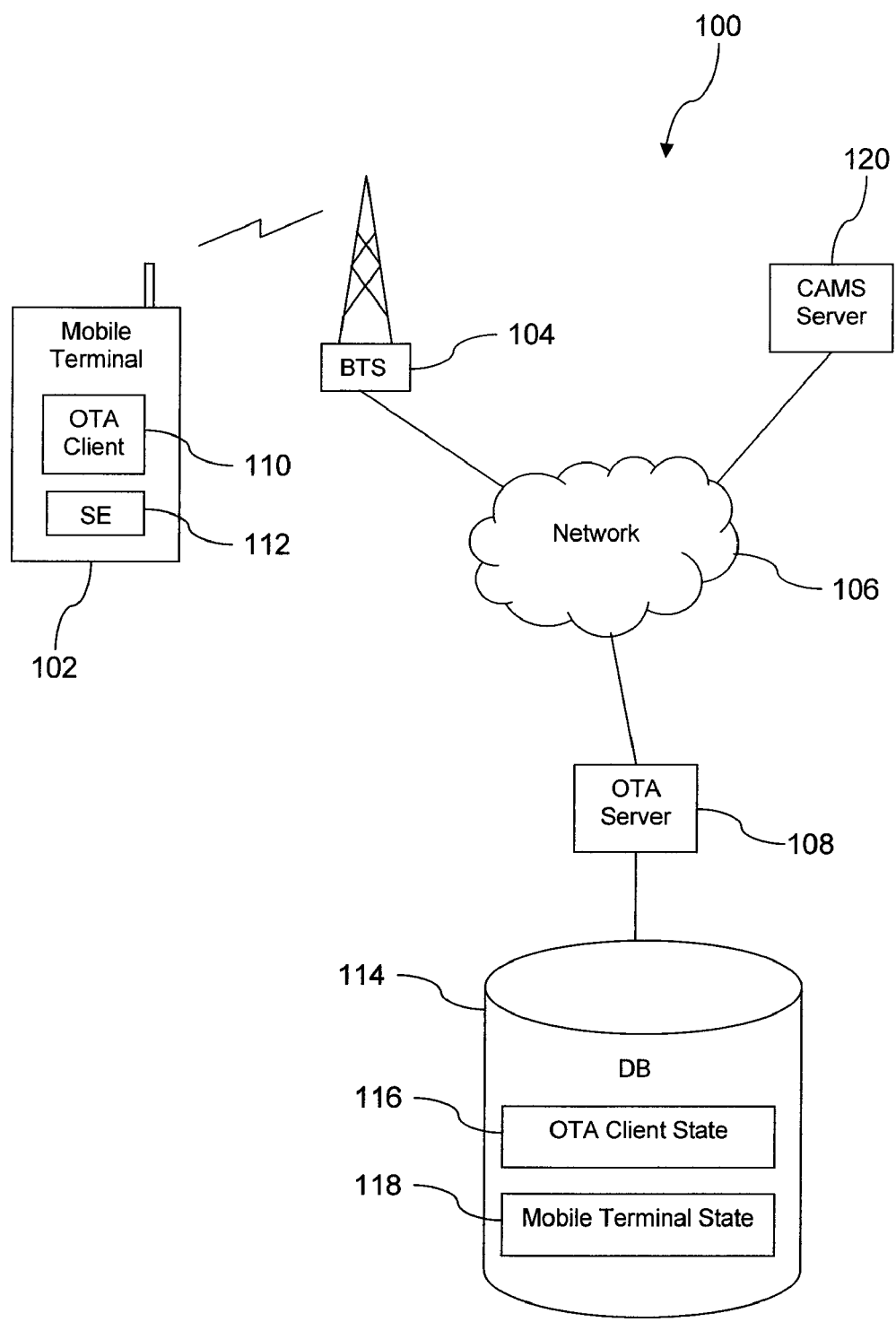
FIG. 1 is a block diagram of a system for provisioning a mobile terminal according to an embodiment of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

In an embodiment, an over-the-air (OTA) server controls a message exchange with an over-the-air client application on a mobile terminal to manage provisioning of the mobile terminal. The provisioning actions may include installing and activating a new payment card, changing configured properties of the over-the-air client, and pulling a log of over-the-air tasks that have completed. The provisioning actions may also include provisioning a hotel electronic key suitable for opening a hotel or motel door, for example, by emitting an appropriate access code through contact-less communication means. The over-the-air server may segment a multi-operation provisioning task into separate workflow steps and may effectively preempt a first provisioning task being completed as a series of workflow steps by the over-the-air client on the mobile terminal with a higher priority second provisioning task, for example, by sending the request messages associated with the second provisioning task before resuming the remaining workflow steps of the first provisioning task. In an embodiment, the over-the-air server may work with a card application management system (CAMS) server to obtain appropriate application protocol data units (APDU) that contain the commands needed to provision a secure element (SE) of a reserved memory area on the mobile terminal. In another embodiment, the over-the-air server may work with a smart card management system (SCMS) server to obtain appropriate application protocol data units that containing the commands needed to provision the secure element or a smart card on the mobile terminal. In other embodiments, however, the over-the-air server is configured to generate the needed APDU commands without the assistance of the CAMS server or of the smart card management system server. The over-the-air server is also able to provision payment cards that are not installed in the secure element, for example, transit cards. The over-the-air client is configured to attempt to reestablish a lost connection with the over-the-air server a configurable number of first retries after a configurable first timeout interval. The over-the-air server is configured to attempt to reestablish a lost connection with the over-the-air client a configurable number of second retries after a configurable second timeout interval. In an embodiment, the over-the-air server is coupled to a database containing entries associated with the state of the over-the-air client and entries associated with the state of the mobile terminal.

Turning now to FIG. 1, a system 100 for provisioning a mobile terminal 102 is discussed. The system comprises the mobile terminal 102, a base transceiver station (BTS) 104, a network 106, and an over-the-air (OTA) server 108. The mobile terminal 102 includes an over-the-air (OTA) client 110 and optionally a secure element (SE) 112. In an embodiment, the over-the-air server 108 is coupled to a database 114 that contains a plurality of data entries including an over-the-air client state 116 associated with the over-the-air client 110 and a mobile terminal (MT) state 118 associated with the mobile terminal 102. In an embodiment, the system 100 also optionally includes a CAMS server 120. In another embodiment, the system 100 comprises a smart card management system server (not shown) instead of or in addition to the CAMS server 120.

The mobile terminal 102 may be a mobile phone, a personal digital assistant (PDA), a tablet computer, a laptop computer, or other mobile electronic device having a wireless communication capability. The mobile terminal 102 may provide a variety of communication and other services to a user, for example, voice communication, data communication, video communication, multi-media communication, on-line gaming, off-line gaming, personal organization tool, calendar tool, contact list, and others. The mobile terminal 102 communicates with other devices via a wireless link to the base transceiver station 104. A handset that may be suitable for implementing the mobile terminal 102 is discussed further hereinafter.

The base transceiver station 104 may be coupled to the network 106 by a wired communication link. The mobile terminal 102 may communicate with another device in the coverage area of the base transceiver station 104 by way of a wireless link (not shown) from the base transceiver station 104 to the other device. The mobile terminal 102 may communicate with devices outside the coverage area of the base transceiver station 104 via the base transceiver station 104 by way of the network 106.

The over-the-air server 108 is coupled to the mobile terminal 102 via the network 106 and the base transceiver station 104. The over-the-air client 110 performs a variety of provisioning related actions in response to request messages sent by the over-the-air server 108 to the over-the-air client 110. In an embodiment, the over-the-air client 110 may respond to the request message by executing one or many instructions on the mobile terminal 102. In an embodiment, a provisioning session is initiated by the over-the-air server 108 sending a push message to the over-the-air client 110. The over-the-air client 110 and the over-the-air server 108 complete appropriate authentication procedures before initiating the provisioning session. Typically the provisioning session comprises the over-the-air client 110 receiving a request message to perform some pre-defined workflow from the over-the-air server 108, performing the workflow, which may include several separate steps or actions, and sending a reply to the over-the-air server 108 containing the status or result of the requested workflow. The over-the-air server 108 may send additional request messages or a request complete message to the over-the-air client 110 to end the provisioning session. The communications between the over-the-air server 108 and the over-the-air client 110 are connectionless, in the sense that there is no continuous communications link set up. Communications links are set up and torn down as needed to send individual messages.

The over-the-air client 110 may maintain a log of completed workflows. The over-the-air client 110 may transmit the contents of the log to the over-the-air server 108 when so requested. The over-the-air client 110 limits the length of the log file based on a log file size configuration parameter stored in a properties file or storage area associated with the over-the-air client 110. The over-the-air client 110 may modify the log file size and other configuration parameters based on a request from the over-the-air server 108. Some of the other configuration parameters may include a connection time-out period and a maximum number of reconnect attempts. The over-the-air server 108 may request the over-the-air client 110 to change the configuration parameters, and the requested changes become effective at that point in time, for example, during the middle of an on-going provisioning session. The configuration parameters may also be referred to as over-the-air client properties. The over-the-air client properties may be stored in a JAVA descriptor file (JAD) or in a record store.

The over-the-air server 108 manages provisioning of payment and other financial information onto the mobile terminal 102. For example, the over-the-air server 108 may manage provisioning a major credit card into the secure element 112 of the mobile terminal 102 in response to a request from the issuing financial institution. In another example, the over-the-air server 108 may manage provisioning a coupon onto the mobile terminal 102, in an area outside the secure element 112. In an embodiment, the over-the-air server 108 is also able to provision debit cards, hotel keys, and to pull a list of identifiers associated with financial cards issued to the mobile terminal 102.

The over-the-air server 108 may segment a provisioning session into a greater or lesser number of workflow requests. Segmenting a provisioning session into a greater number of workflow requests may have the disadvantage of less efficient communications throughput, because of increased overhead, but may have the advantage of making error recovery in the event of a communication problem, for example, a dropped wireless link, more manageable. Segmentation of provisioning may be based, at least in part, on consideration of completing some actions or workflows as atomic transactions, for example, transactions that should be completed in their entirety or not at all, at the risk of leaving data in a self-contradictory state if this principle is violated. In an embodiment, a workflow may be segmented into substantially the smallest possible workflow requests. This approach may promote greater flexibility for preemption and running a higher priority workflow request. In another embodiment, a workflow may be segmented to assure that no single workflow request consumes more than about a maximum limit of time, thereby providing a reasonable expectation that any workflow can be preempted within about that maximum limit of time. In an embodiment, a single workflow request would be allowed to exceed the maximum limit of time if to break the workflow request up would break an operation desired to be executed as an atomic transaction.

The over-the-air server 108 may be managing a first provisioning task when an external event occurs that justifies preempting the first provisioning task with a second provisioning task. For example, the over-the-air server 108 may be provisioning a new credit card onto the mobile terminal 102 when a service provider reports the mobile terminal 102 as being lost, whereupon the various payment cards of the mobile terminal 102 are desired to be cancelled. The over-the-air server 108 may effectively preempt the first provisioning task by sending the series of provisioning requests associated with the second provisioning task to the over-the-air client 110 and then resuming sending the series of remaining requests associated with the first provisioning task to the over-the-air client 110 after the second provisioning task has been completed. The over-the-air client 110 has no knowledge of having been preempted, because the over-the-air client 110 simply performs each requested workflow in its entirety and then waits for the next provisioning request. The ability to preempt provisioning actions may also be considered during segmentation of provisioning actions into separate workflows. The over-the-air server 108 may associate a task identifier with each provisioning task. The over-the-air-server 108 may include the task identifier in each request sent to the over-the-air client 110, and the over-the-air client 110 may include the task identifier in log entries associated with workflow completions. In an embodiment, the over-the-air server 108 may issue a stop command to the over-the-air client 110 that causes the over-the-air client 110 to stop all in-progress provisioning workflows. The over-the-air client 110 may be configured to terminate the provisioning session on the event of receiving the stop command. Continued provisioning, in an embodiment, may be initiated by establishing a new provisioning session.

The over-the-air client 110 may be configured to time-out if no communication is received from the over-the-air server 108 within a first timeout period. The over-the-air client 110 may be configured to attempt to reestablish the communication link with the over-the-air server 108 a number of times determined by a first retries count. The first timeout period and the first retries count may be configured in the properties of the over-the-air client 110. The first timeout period may in the range from about five minutes to about fifteen minutes, but in another embodiment a different first timeout period may be employed.

The over-the-air server 108 may be configured to time-out if no reply is received from the over-the-air client 110 within a second timeout period. The over-the-air server 108 may be configured to attempt to reestablish the communication link with the over-the-air client 110 a number of times determined by a second retries count. The second timeout period may be in the range from about ten minutes to about sixty minutes, but in another embodiment a different second timeout period may be employed. The second timeout period may be greater than the first timeout period. In another embodiment, however, the second timeout period may be less than the first timeout period or may not exist at all.

The over-the-air server 108 may create entries in the database 114 to store the state of the mobile terminal 102 and the state of the over-the-air client 110, for example the over-the-air client state 116 and the mobile terminal state 118. The over-the-air client state 116 may be generated for each of the replies received from the over-the-air client 110 and record the status of the associated provisioning request. The mobile terminal state 118 may store the on-line status of the mobile terminal 102.

In an embodiment, the over-the-air server 108 may pull a list of task identifiers associated with cards issued to the mobile terminal 102. The over-the-air server 108 is then able to determine the cards that have been issued to the mobile terminal 102 by searching the database 114 using the list of task identifiers.

Figure 2:
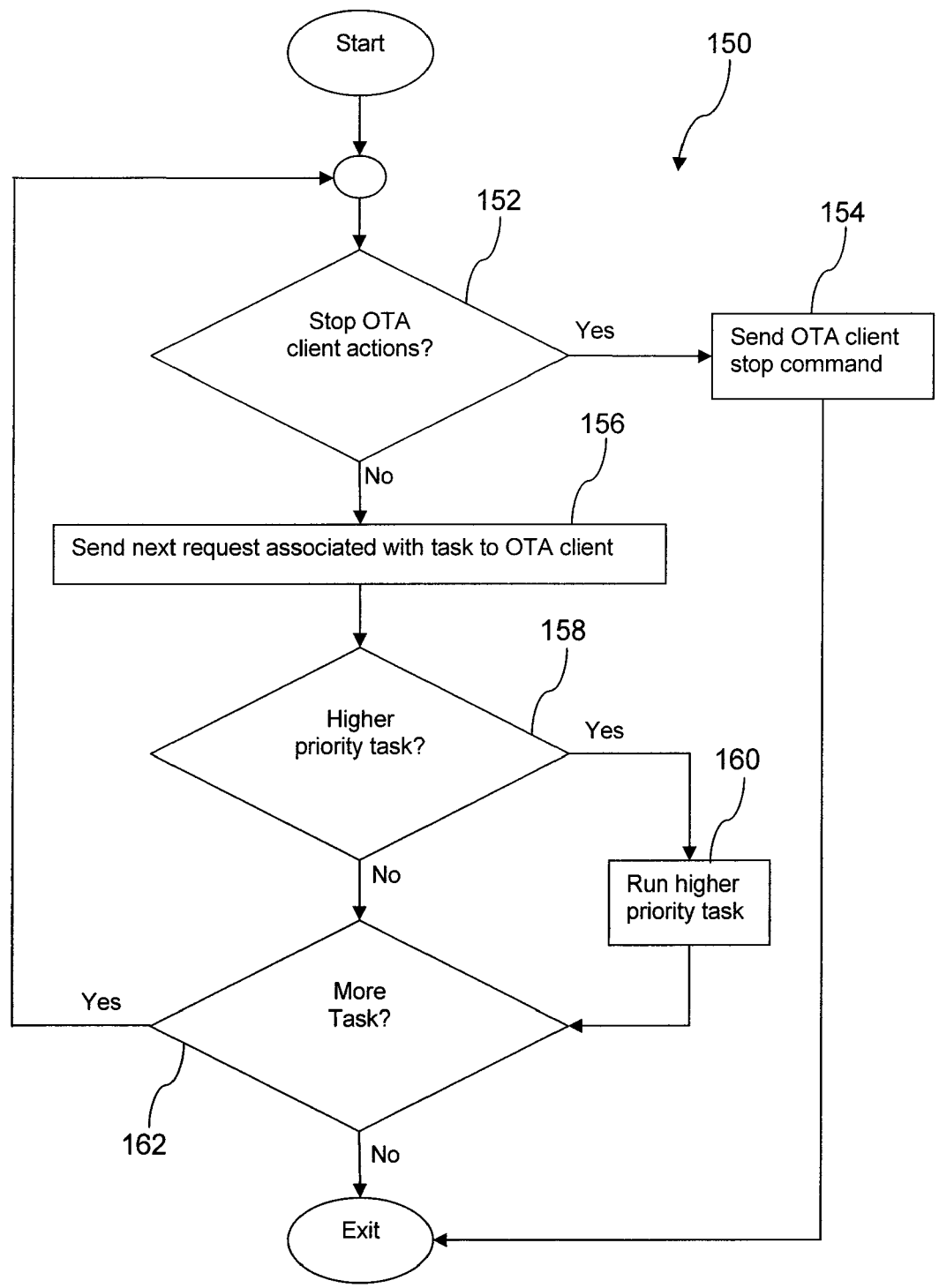
FIG. 2 is a method of provisioning a mobile terminal according to an embodiment of the disclosure.

Turning now to FIG. 2, a method 150 for the over-the-air server 108 conducting a provisioning session is described. The context of method 150 assumes that a provisioning session has been established between the over-the-air server 108 and the over-the-air client 110. The method 150 begins at block 152 where if a provisioning stop command is called for, the method proceeds to block 154 where a stop command is sent to the over-the-air client 110. The method then exits. At block 152 if a provisioning stop command is not called for, the method proceeds to block 156 where the over-the-air server 108 sends the next provisioning request associated with a task identity to the over-the-air client 110.

The method proceeds to block 158 where if a higher priority task is ready, the method proceeds to block 160 where the higher priority task is completed. In an embodiment, the higher priority task is completed according to the method 150, for example beginning at block 152. If no higher priority task is ready, the method proceeds to block 162. At block 162 if more workflow steps remain to complete the provisioning task associated with the task identity, the method returns to block 152, otherwise the method exits.

The method 150 illustrates how prioritization of provisioning tasks may be implemented. Stated simply, when a higher priority provisioning task is ready, the over-the-air server 108 just stops stepping through the series of workflow steps associated with the lower priority provisioning task and begins stepping through the series of workflow steps associated with the higher priority provisioning task. When the higher priority task is completed, the over-the-air server 108 resumes stepping through the series of workflow steps associated with the lower priority provisioning task where it left off. The method 150 is applicable to more than one higher priority task.

Figure 3:
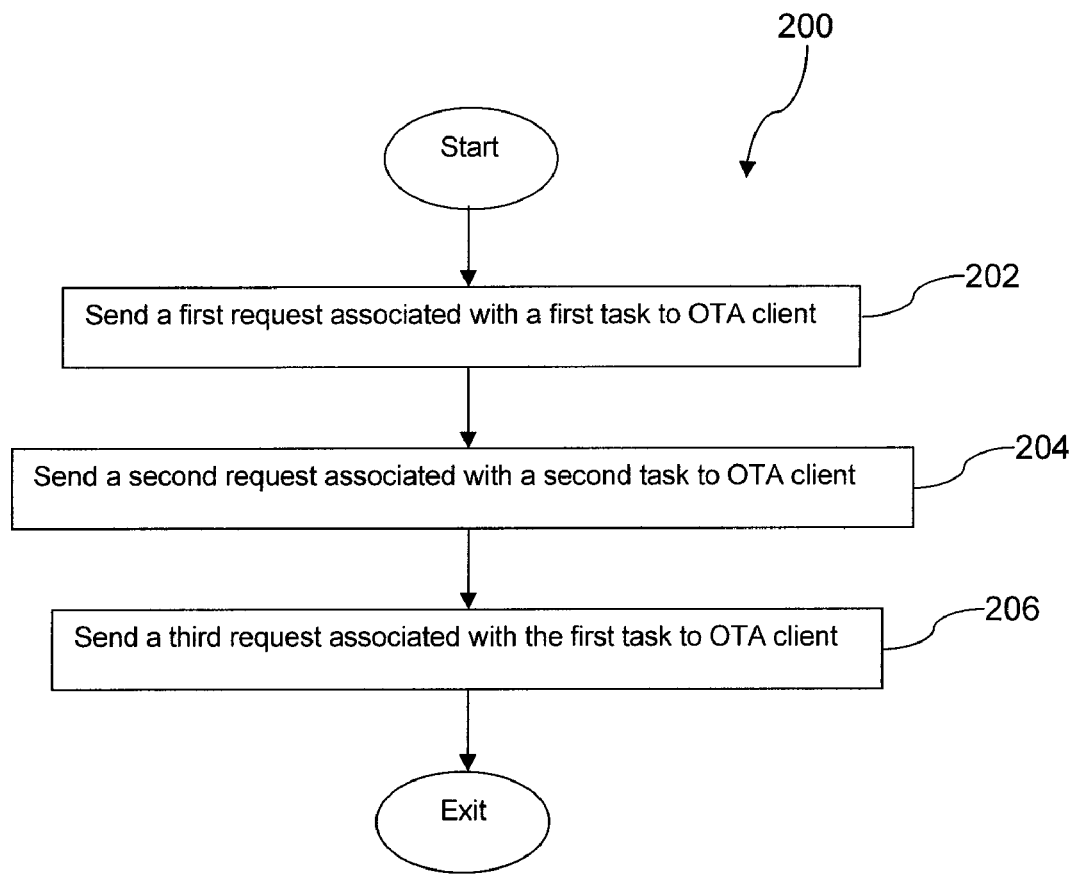
FIG. 3 is another method of provisioning a mobile terminal according to an embodiment of the disclosure.

Turning now to FIG. 3, a method 200 for conducting a portion of a provisioning session is described. At block 202 the over-the-air server 108 sends a first provisioning request associated with a first provisioning task to the over-the-air client 110. At block 204 the over-the-air server 108 sends a second request associated with a second provisioning task, for example, a provisioning task having a higher priority than the first provisioning task, to the over-the-air client 110. At block 206, the over-the-air-server 108 sends a third request associated with the first provisioning task to the over-the-air client 110. In an embodiment, additional requests associated with the second provisioning task may be sent to the overthe-air client 110 between block 202 and block 206. Additional requests associated with the first provisioning task may be sent to the over-the-air client 110 before block 202 and after block 206. The method 200 can be seen to be a special case or example of executing the method 150.

Figure 4:
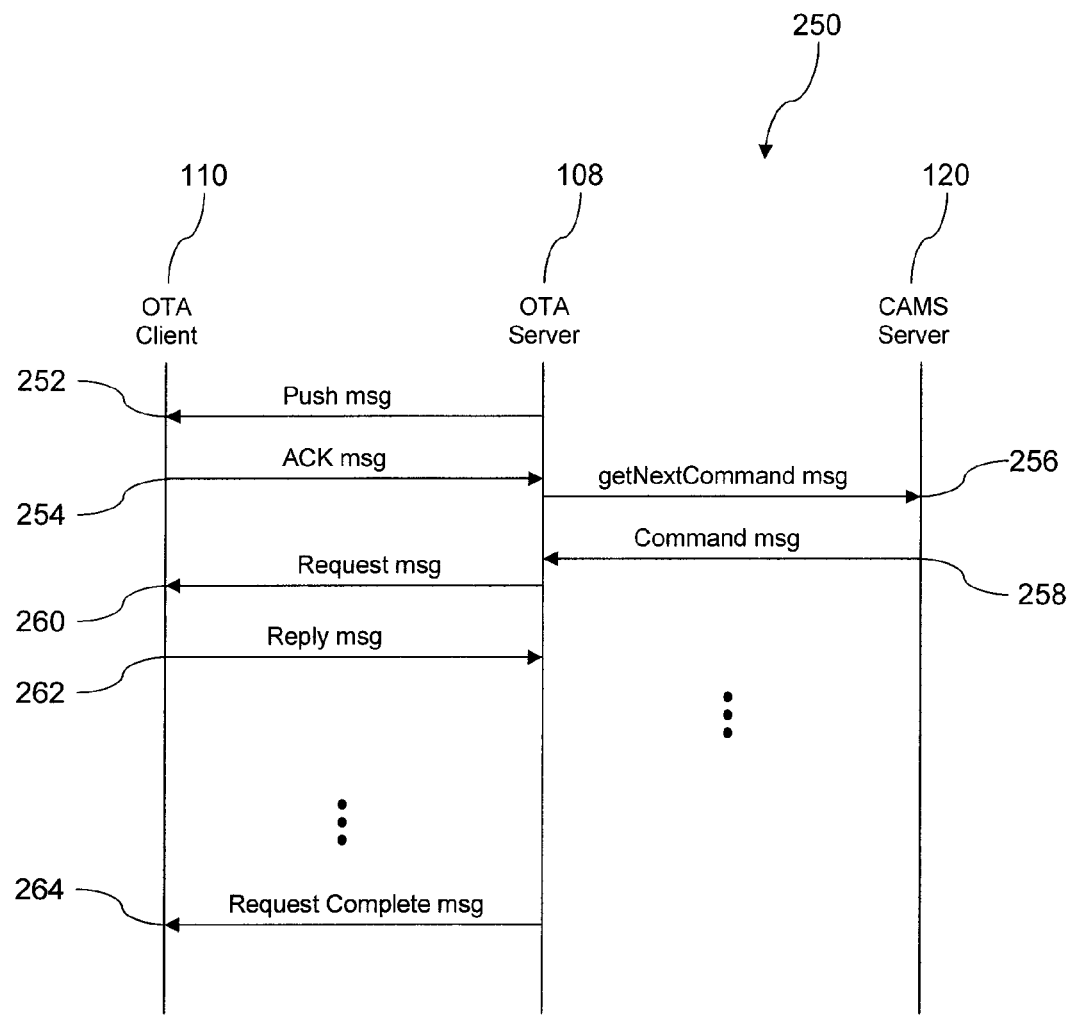
FIG. 4 is a message sequence diagram for provisioning a mobile terminal according to an embodiment of the disclosure.

Turning now to FIG. 4, a message sequence 250 is described. The over-the-air server 108 sends a push message 252 to the over-the-air client 110 to initiate a provisioning session. The over-the-air client 110 sends an acknowledgment message 254 to the over-the-air server 108. The over-the-air server 108 and the over-the-air client 110 may conduct authentication operations (not shown). The over-the-air server 108 sends a getNextCommand message 256 to the CAMS server 120. The CAMS server 120 sends a command message 258 to the over-the-air server 108 containing an application protocol data unit encoding a secure element provisioning command. In an embodiment, the CAMS server 120 may maintain a provisioning state associated with provisioning a new payment card, for example, a credit card, onto the mobile terminal 102. In an embodiment, a smart card management system server may perform substantially the same function ascribed to the CAMS server 120 in the description above. The over-the-air server 108 sends a request message 260 to the over-the-air client 110 containing the application protocol data unit and a task identity associated with the provisioning task. The over-the-air client 110 performs the requested provisioning command and returns a reply message 262 containing the status of the requested workflow and the task identity to the over-the-air-server 108. A plurality of the messages 256, 258, 260, and 262 may be exchanged to complete the desired provisioning session. The over-the-air server 108 sends a request complete message 264 to the over-the-air client 110 to complete the provisioning session. The over-the-air server 108 may store the sequence of request messages 260 and the sequence of reply messages in the database 114.

Figure 5:
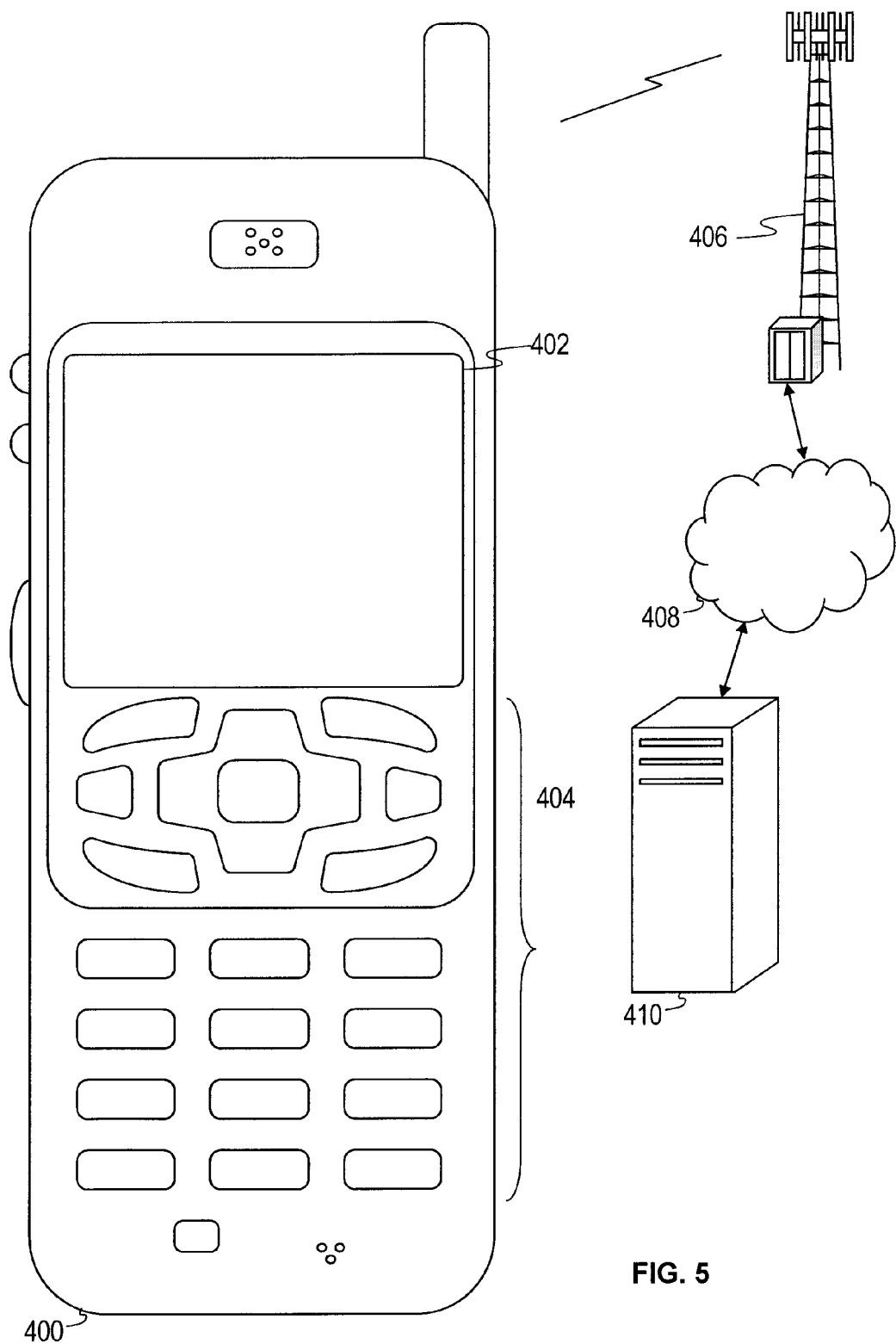
FIG. 5 is an illustration of a handset that is suitable for implementing an embodiment of the disclosure.

FIG. 5 illustrates a wireless communications system including the handset 400. FIG. 5 depicts the handset 400, which is operable for implementing aspects of the present disclosure, for example, for implementing the mobile terminal 102 discussed above. Though illustrated as a mobile phone, the handset 400 may take various forms including a wireless handset, a pager, a personal digital assistant (PDA), a portable computer, a tablet computer, or a laptop computer. Many suitable handsets combine some or all of these functions. In some embodiments of the present disclosure, the handset 400 is not a general-purpose computing device like a portable, laptop or tablet computer, but rather is a special-purpose communications device such as a mobile phone, wireless handset, pager, or PDA. The handset 400 may support specialized activities such as gaming, inventory control, job control, and/or task management functions, and so on.

The handset 400 includes a display 402 and a touch-sensitive surface or keys 404 for input by a user. The handset 400 may present options for the user to select, controls for the user to actuate, and/or cursors or other indicators for the user to direct. The handset 400 may further accept data entry from the user, including numbers to dial or various parameter values for configuring the operation of the handset. The handset 400 may further execute one or more software or firmware applications in response to user commands. These applications may configure the handset 400 to perform various customized functions in response to user interaction. Additionally, the handset 400 may be programmed and/or configured over-the-air, for example, from a wireless base station, a wireless access point, or a peer handset 400.

The handset 400 may execute a web browser application which enables the display 402 to show a web page. The web page may be obtained via wireless communications with a cell tower 406, a wireless network access node, a peer handset 400 or any other wireless communication network or system. The cell tower 406 (or wireless network access node) is coupled to a wired network 408, such as the Internet. Via the wireless link and the wired network, the handset 400 has access to information on various servers, such as a server 410. The server 410 may provide content that may be shown on the display 402. Alternately, the handset 400 may access the cell tower 406 through a peer handset 400 acting as an intermediary, in a relay type or hop type of connection.

Figure 6:
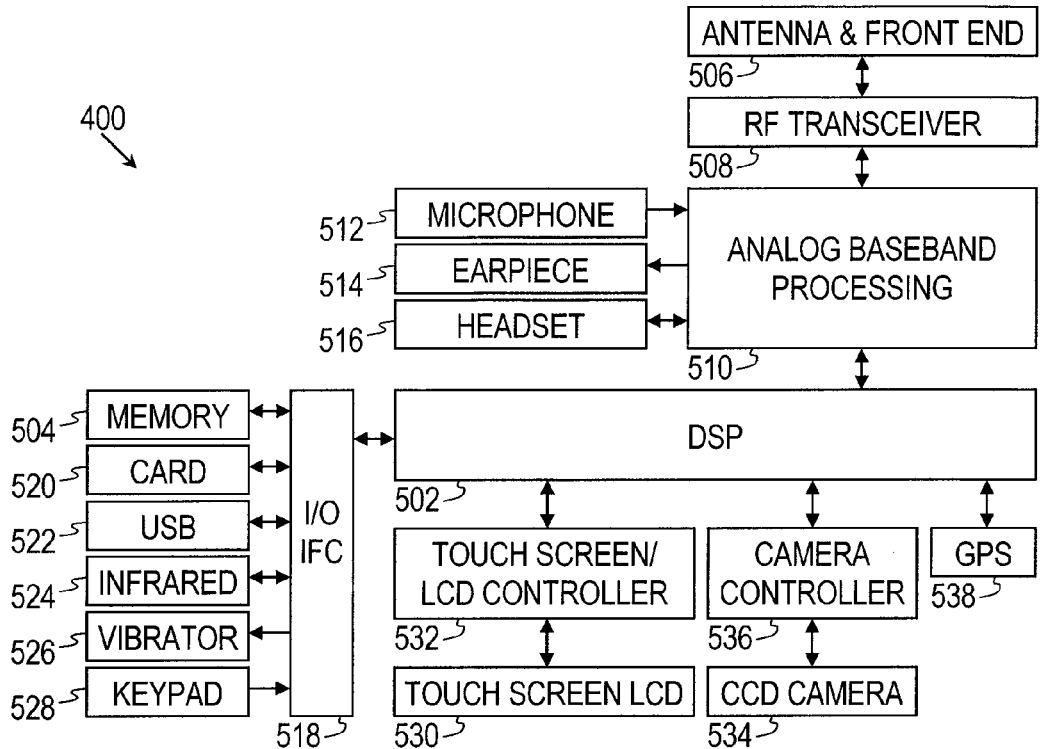
FIG. 6 is a block diagram of a handset that is suitable for implementing an embodiment of the disclosure.

FIG. 6 shows a block diagram of the handset 400. While a variety of known components of handsets 102 are depicted, in an embodiment, a subset of the listed components and/or additional components not listed may be included in the handset 400. The handset 400 includes a digital signal processor (DSP) 502 and a memory 504. As shown, the handset 400 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the handset 400 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the handset 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520, or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the handset 400 to send and receive information from a cellular network, or some other available wireless communications network, or from a peer handset 400. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions, a radio transceiver or RF transceiver may be understood to include other signal processing functionality such as modulation/ demodulation, coding/decoding, interleaving/deinterleaving, spreading/despreading, inverse fast fourier transforming (IFFT)/fast fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 408, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example, analog processing of inputs from the microphone 512 and the headset 516 and outputs to the earpiece 514 and the headset 516. To that end, the analog baseband processing unit 510 may have ports for connecting to the built-in microphone 512 and the earpiece speaker 514 that enable the handset 400 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example, by the DSP 502 or by other central processing units.

The DSP 502 may perform modulation/demodulation, coding/decoding, interleaving/deinterleaving, spreading/despreading, inverse fast fourier transforming (IFFT)Ifast fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast fourier transforming, and cyclic prefix appending, and for a receiver function the DSP 502 may perform cyclic prefix removal, fast fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the infrared port 524. The USB interface 522 may enable the handset 400 to function as a peripheral device to exchange information with a personal computer or other computer system. The infrared port 524 and other optional ports such as a Bluetooth interface or an IEEE 802.11 compliant wireless interface may enable the handset 400 to communicate wirelessly with other nearby handsets and/or wireless base stations.

The input/output interface 518 may further connect the DSP 502 to the vibrator 526 that, when triggered, causes the handset 400 to vibrate. The vibrator 526 may serve as a mechanism for silently alerting the user to any of various events such as an incoming call, a new text message, and an appointment reminder.

The keypad 528 couples to the DSP 502 via the input/output interface 518 to provide one mechanism for the user to make selections, enter information, and otherwise provide input to the handset 400. Another input mechanism may be the touch screen LCD 530, which may also display text and/or graphics to the user. The touch screen LCD controller 532 couples the DSP 502 to the touch screen LCD 530.

The CCD camera 534 enables the handset 400 to take digital pictures. The DSP 502 communicates with the CCD camera 534 via the camera controller 536. The GPS sensor 538 is coupled to the DSP 502 to decode global positioning system signals, thereby enabling the handset 400 to determine its position. In another embodiment, a camera operating according to a technology other than charge-coupled device cameras may be employed. Various other peripherals may also be included to provide additional functions (e.g., radio and television reception).

Figure 7:
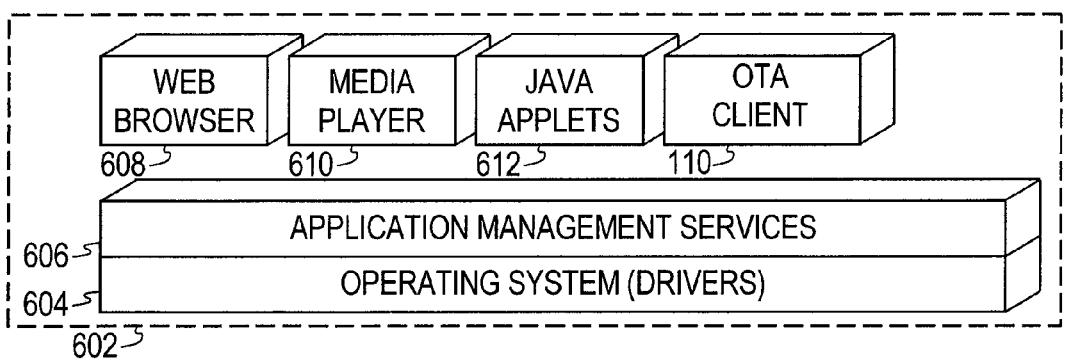
FIG. 7 is a block diagram of a software architecture of a handset that is suitable for implementing an embodiment of the disclosure.

FIG. 7 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services (AMS) 606 that transfer control between applications running on the handset 400. Also shown in FIG. 7 are a web browser application 608, a media player application 610, Java applets 612, and the over-the-air client 110. The web browser application 608 configures the handset 400 to operate as a web browser, allowing a user to enter information into forms and select links to retrieve and view web pages. The media player application 610 configures the handset 400 to retrieve and play audio or audiovisual media. The Java applets 612 configure the handset 400 to provide games, utilities, and other functionality.

Figure 8:
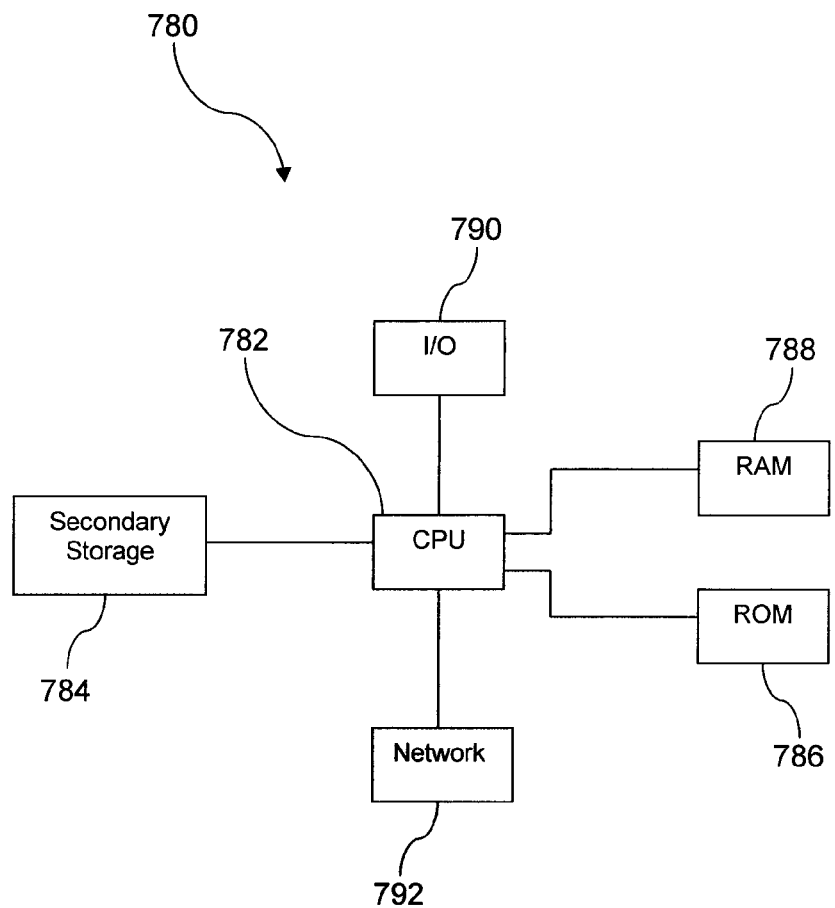
FIG. 8 illustrates an exemplary general-purpose computer system suitable for implementing the several embodiments of the disclosure.

The system described above may be implemented on any general-purpose computer with sufficient processing power, memory resources, and network throughput capability to handle the necessary workload placed upon it. FIG. 8 illustrates a typical, general-purpose computer system suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor may be implemented as one or more CPU chips.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage. The RAM 788 is used to store volatile data and perhaps to store instructions. Access to both ROM 786 and RAM 788 is typically faster than to secondary storage 784.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 792 may enable the processor 782 to communicate with an Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782, for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for over-the-air provisioning, comprising:
a processor;
an over-the-air server application stored on a non-transitory computer readable medium that, when executed by the processor, is configured to:
request and receive a log of completed provisioning tasks from an over-the-air client on a mobile terminal,
manage an over-the-air provisioning session with the over-the-air client to complete a provisioning task that is segmented into a plurality of workflow steps, wherein for each of the plurality of workflow steps the over-the-air server application is configured to send an action request to the over-the-air client and to await receipt of an acknowledgment of the action request from the over-the-air client, and wherein the provisioning task is one of a task to install and activate a new electronic transaction card on the mobile terminal via the over-the-air client or a task to change a configuration parameter of the over-the-air-client,
stop the over-the-air provisioning session when the acknowledgment for the action request of one of the plurality of workflow steps is not received from the over-the-air client within a first time period, and
attempt to restart the over-the-air provisioning session after waiting a second time period when the over-the-air provisioning session has been stopped.

2. The system of claim 1, wherein each of the completed provisioning tasks in the log is associated with a task identity.

3. The system of claim 1, wherein the first time period is in the range of about five minutes to about fifteen minutes and the second time period is in the range of about fifteen minutes to about sixty minutes.

4. The system of claim 1, wherein the action request comprise an application protocol data unit.

5. The system of claim 1, wherein the new electronic transaction card is one of a payment card or an access card.

6. The system of claim 5, wherein the payment card is one of a credit card, a debit card, and a transit card.

7. The system of claim 1, wherein the configuration property of the over-the-air client is selected from the group of configuration properties consisting of a log file size, a connection time-out period, and a number of times the over-the-air client will attempt to reconnect to the over-the-air server application when an established connection is dropped.

8. A method of provisioning an electronic device over-the-air, comprising:
sending, by an over-the-air provisioning server, a first request to an over-the-air client on a mobile terminal, the first request including an identification of a first requested action and a first task identity;
sending, by an over-the-air provisioning server, a second request to the over-the-air client on the mobile terminal after sending the first request, the second request including an identification of a second requested action and a second task identity; and
sending, by an over-the-air provisioning server, a third request to the over-the-air client on the mobile terminal after sending the second request, the third request including an identification of a third requested action and the first task identity, wherein the first task identity identifies a first over-the-air provisioning task to be accomplished by the over-the-air client and wherein accomplishing the first over-the-air provisioning task comprises at least accomplishing the first requested action and accomplishing the third requested action.

9. The method of claim 8, wherein the second task is a higher priority than the first task.

10. The method of claim 8, wherein the first task is decomposed into a plurality of requested actions and wherein a level of complexity of the requested actions is based on the reliability of a wireless communication link with the over-the-air client.

11. The method of claim 8, wherein the first task is decomposed into a plurality of requested actions and wherein the level of complexity of the requested actions is based on when the first task can be interrupted by the second task.

12. A system for over-the-air provisioning, comprising:
a mobile terminal comprising a processor and an over-the-air client that, when executed by the processor, is configured to perform a workflow action based on a received request, wherein the request includes a requested action and a task identity, and to produce an acknowledgment that includes a result of the workflow action and the task identity; and
an over-the-air server that is configured to establish a connection to the mobile terminal, to segment an over-the-air provisioning task associated with the task identity into multiple requests, to manage transmitting the multiple requests to the mobile terminal in sequence, and to await receipt of the acknowledgment of each of the requests from the mobile terminal, wherein managing transmitting the multiple requests is based in part on the acknowledgment of each of the requests from the mobile terminal, and wherein the over-the-air provisioning task is one of a task to install and activate a new electronic transaction card on the mobile terminal via the over-the-air client or a task to change a configuration parameter of the over-the-air-client.

13. The system of claim 12, wherein the acknowledgment is provided in extensible mark-up language format.

14. The system of claim 12, wherein the task comprises one of provisioning the mobile terminal with a credit card, a debit card, a transit card, and a coupon.

15. The system of claim 12, wherein the task comprises provisioning a payment entity in a secure element of the mobile terminal.

16. The system of claim 12, wherein the over-the-air server is further configured to authenticate the mobile terminal while establishing the connection to the mobile terminal.

17. The system of claim 12, further including a database containing a log of requests sent by the over-the-air server to the mobile terminal, the state of the mobile terminal, and the received acknowledgments, wherein the over-the-air server is configured to determine that the connection has dropped when the mobile terminal does not return a timely acknowledgment, to reestablish the connection at a later time, and to resume the task in process when the connection dropped based on the information contained in the database.

18. The system of claim 12, wherein the over-the-air server is further configured to interleave transmissions of requests associated with different tasks.

19. The system of claim 12, wherein one of the requests identifies a plurality of workflow actions.

20. The method of claim 8, wherein the first over-the-air provisioning task is one of a task to install and activate a new electronic transaction card on the mobile terminal via the over-the-air client or a task to change a configuration parameter of the over-the-air-client.

* * * * *